United States Patent
Finefrock

[11] 3,799,101
[45] Mar. 26, 1974

[54] BEARING FOR ARTICULATED BARGE OR THE LIKE

[75] Inventor: Donald W. Finefrock, Chagrin Falls, Ohio

[73] Assignee: The Johnson Rubber Company, Middlefield, Ohio

[22] Filed: June 29, 1973

[21] Appl. No.: 375,045

[52] U.S. Cl............ 114/235 A, 114/235 R, 308/238
[51] Int. Cl............................................. B63b 21/56
[58] Field of Search..... 114/235 R, 235 A; 308/238, 308/239; 92/160

[56] References Cited
UNITED STATES PATENTS

| | | | |
|---|---|---|---|
| 2,381,249 | 8/1945 | Bastian | 308/238 |
| 2,638,850 | 5/1953 | Ferris | 92/160 X |
| 2,748,718 | 6/1956 | MacClatchie | 92/160 X |
| 3,076,683 | 2/1963 | Hanley | 308/238 X |
| 3,168,013 | 2/1965 | Williamson | 92/160 X |
| 3,178,239 | 4/1965 | Zeller | 308/239 X |
| 3,407,779 | 10/1968 | Satterthwaite et al. | 308/238 X |
| 3,458,214 | 7/1969 | West | 308/238 X |
| 3,512,495 | 5/1970 | Fletcher | 114/235 R |
| 3,515,449 | 6/1970 | Harbage, Jr. | 308/238 |
| 3,606,505 | 9/1971 | Satterthwaite et al. | 308/238 |

*Primary Examiner*—George E. A. Halvosa
*Assistant Examiner*—Edward R. Kazenske
*Attorney, Agent, or Firm*—McNenny, Farrington, Pearne & Gordon

[57] ABSTRACT

There is provided an improved bearing structure for an articulated tug and barge. The tug is provided with laterally extendible pins in the bow thereof which fit into cylindrical recesses carried by the stern wing walls of a barge. The bearing structure is characterized by a plurlaity of elongated elastomeric staves forming an elastomeric hinge pin encircling bearing surface coacting between the hinge pins and the barge housing means. The individual staves are characterized by an axially extending lubricating medium groove and an integral groove dam portion at at least one end. Retaining means coact between the housing and the ends of the encircling bearing staves for holding them in position and compressively stressing the staves. An improved stave structure is provided.

7 Claims, 10 Drawing Figures

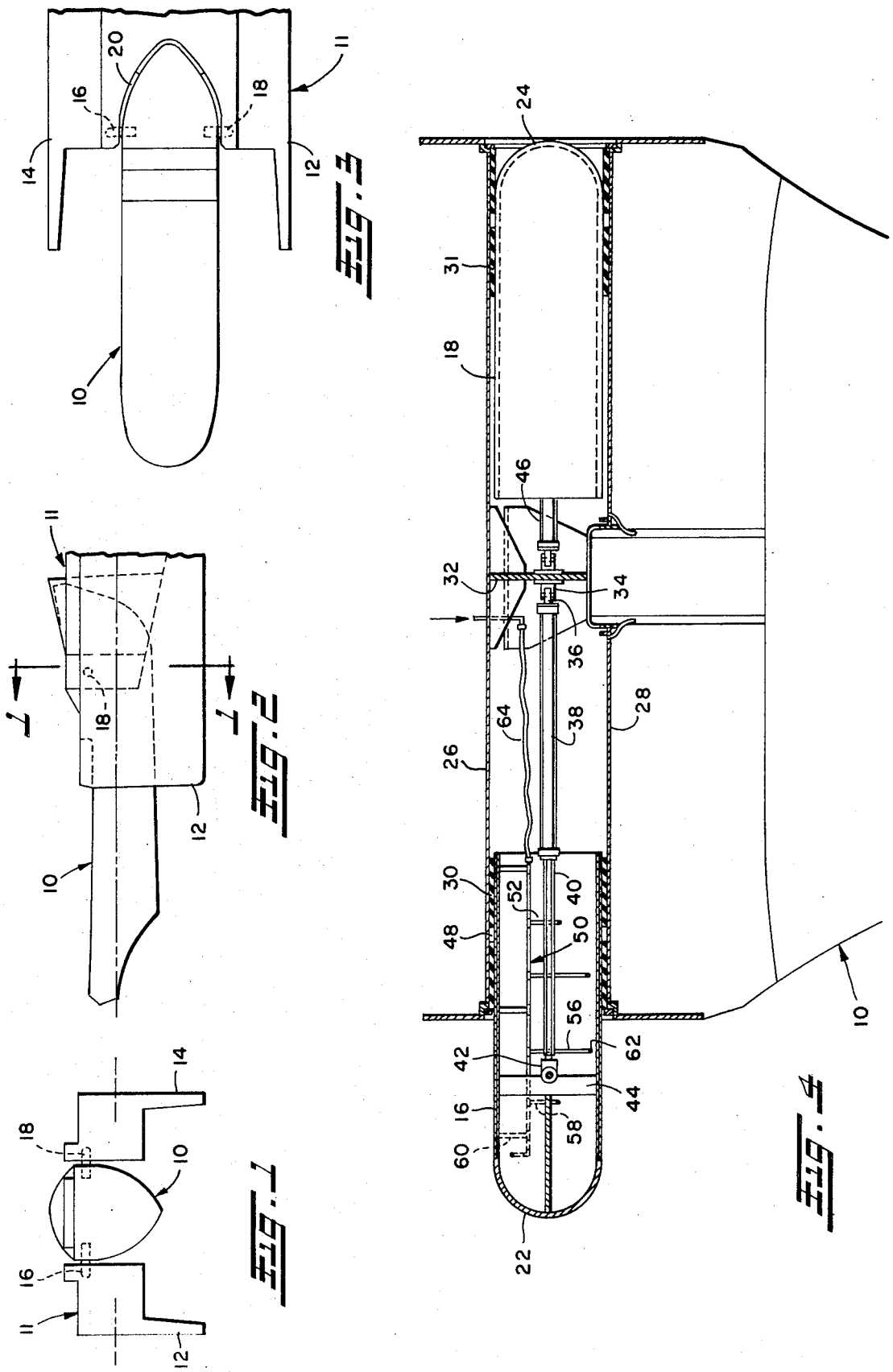

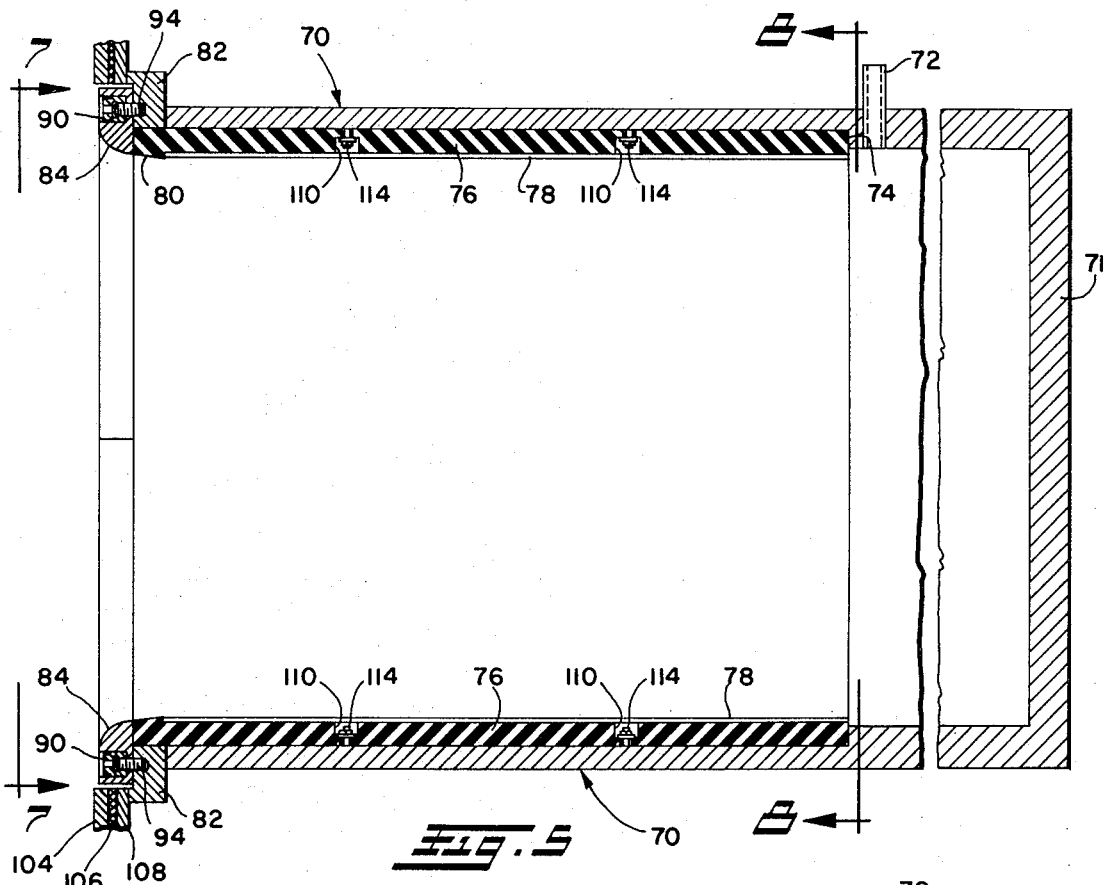
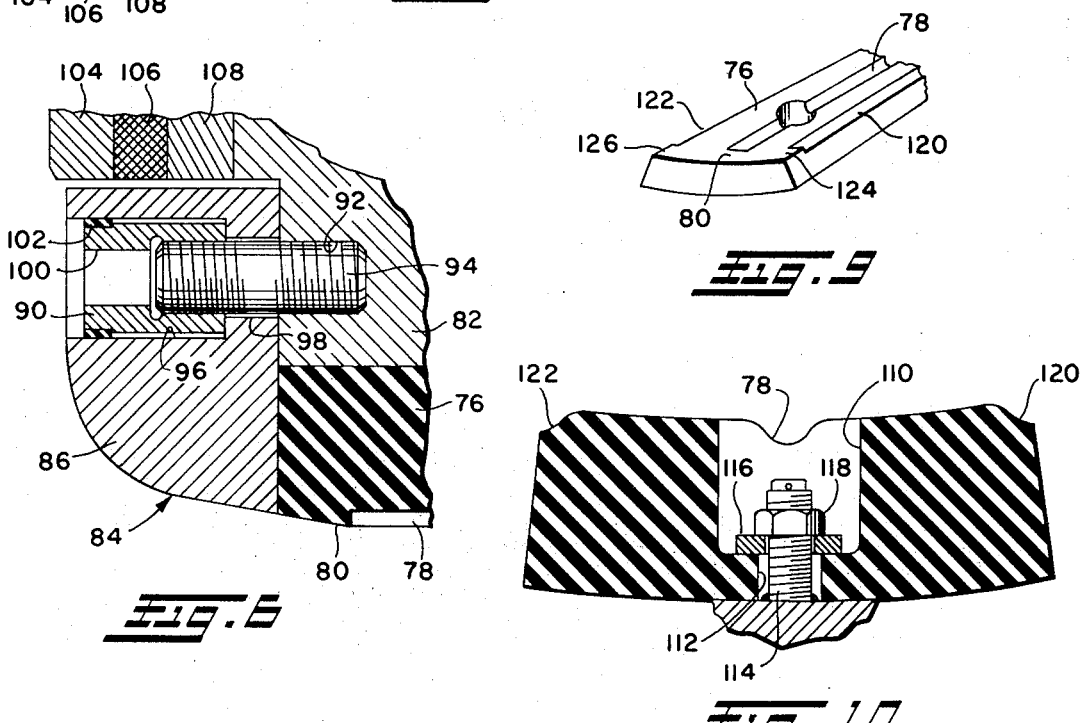

BEARING FOR ARTICULATED BARGE OR THE LIKE

BACKGROUND OF THE INVENTION AND PRIOR ART

The present invention relates as indicated to an improved bearing structure for hinge pins in an articulated tug barge, and a bearing stave therefor. Barge transportation of bulk material was formerly accomplished by means of a lead tug having one or more barges in tow on a hauser. The surging experienced by a tug towing a barge or barges on a hauser at sea became a serious problem which was overcome to a considerable extent by the reversal of the position of the tug and the barge or barges so that the tug was now in a pushing relation. Greater speed was possible, and the problem of "surging" eliminated. However, the rise and fall of the trailing barge in heavy seas, for example, introduced problems of propeller immersion; and, accordingly, the articulated tug/barge concept was developed to alleviate this problem. In this concept, the bow of the pushing tug is provided with laterally extendible hinge pins usually powered by hydraulic jack means. Hinge pin wells or receptacles are provided in the stern portion of a barge to receive the hinge pins and provide an articulated asssembly whereby the stern of the tug is enabled to move in a vertical plane and thus experience better control over propeller immersion than previously available. In order to reduce the wear on the hinge pins and the pin-receiving cylinders, bearing means have been developed and utilize with modification principles of the type of rubber or elastomeric stave bearings heretofore used for propeller shafts as marine bearings. Reference may be had to U.S. Pat. No. 3,606,505 which illustrates one type of marine bearing. Reference may be had also to U.S. Pat. No. No. 3,407,779.

The elastomeric marine bearings exemplified by the prior art patents utilize ambient water for lubrication and are grooved in such a way as to permit a substantial flow of water in the clearance between the shaft and the encircling elastomeric bearing surface.

In the articulated tug and barge assembly, the hinge pins are of large diameter being, for example, on the order of 4 feet in diameter. The forces generated within the bearing are such that it has been found desirable to provide pressurized lubricating means to minimize wear of the bearing and/or the pin. While the marine type elastomeric bearings of the prior art are well suited for use under marine conditions where ambient water is the principal lubricant, in cases where a petroleum base grease is the primary lubricant, undue flow of the lubricating medium through the bearing is undesirable and uneconomical.

The present invention provides, therefore, means for accommodating the elastomeric marine type bearing structure to an articulated tug and barge whereby loss of lubricating medium is minimized.

BRIEF STATEMENT OF THE INVENTION

Briefly stated, the present invention is in an articulated tug and barge including a pusher tug vessel having a pair of retractable hinge pins laterally extendable from the sides of the vessel adjacent the bow, respectively, and a barge having a bow-receiving recess in the stern thereof and including laterally disposed hinge pin-receiving cylinders. The latter are usually disposed in the wing walls of the barge. The improvement comprises bearing housing means carried by the barge and adapted to surround the hinge pins when extended from the vessel. A plurality of segmental elastomeric bearing staves provide an elastomeric hinge pin encircling bearing surface coacting between the hinge pins, respectively, and the barge housing means. Each of the bearing staves is provided with an axially extending lubricating medium groove and at least one integral groove dam portion at at least one end thereof. In a preferred embodiment, marginal half-grooves on the bearing surface are also provided whereby, when the stave is in contiguous relation with a similarly configured stave, a full lubricant groove dammed at one end is thereby formed. Annular retaining means are provided which coact between each housing and the bearing staves contained therein for holding the bearing staves in alignment and compressively stressing the at least one dam portion. Means are provided in the hinge pins for conducting lubricating medium to the interface between the hinge pins and the elastomeric bearing surfaces. Although the clearance between the hinge pins and the elastomeric bearing surface is of the order of about 0.25 inch, during pushing the pressures generated between the hinge pin and the bearing surface are such as to cause considerable expression of lubricating medium through the lubricant grooves unless means are provided for restricting the flow. The present invention solves this problem.

BRIEF DESCRIPTION OF THE DRAWINGS

The invention may be better understood by having reference to the annexed drawings wherein:

FIGS. 1 to 3 show in diagrammatic form three views of an articulated tug/barge and illustrate the environment of the present invention.

FIG. 4 is a fragmentary cross-section of the bow of a tug showing one form of hinge pin operating means.

FIG. 5 is a fragmentary cross-sectional view of a barge hinge pin-receiving cylinder or bearing housing.

FIG. 6 is a fragmentary detail on an enlarged scale showing one end of an elastomeric bearing stave and the integral dam portion closing off one end of the lubricating medium groove and the means for compressively stressing the terminal portion of the stave.

FIG. 9 is a fragmentary perspective view showing the bearing surface of a typical rubber bearing stave.

FIG. 10 is a cross-sectional view on an enlarged scale showing one mode of attachment of the elongated bearing staves to the cylinder walls.

DETAILED DESCRIPTION OF THE DRAWINGS

Figure 7:
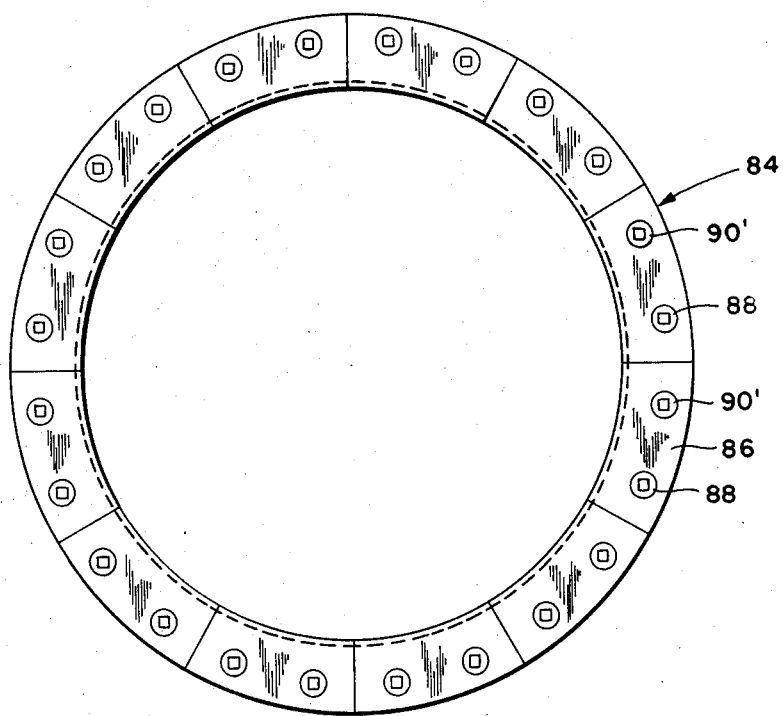
FIG. 7 is an end view of the outboard end of the hinge pin-receiving cylinder shown in FIG. 5.

Referring now more particularly to FIGS. 1 – 3, there is shown in diagrammatic form an articulated tug and barge. FIG. 1 shows a cross-section as it appears in the plane indicated by 1—1 in FIG. 2 illustrating the location of the vessel 10 between the starboard wing wall 12 and the port wing wall 14 of a barge 11. Laterally extending hinge pins 16 and 18 are shown in the extended position joining the tug with the barge in a bowto-stern relationship. FIG. 2 is a side elevation showing the tug vessel 10 in pushing position with respect to the barge 11. FIG. 3 is a top elevation showing the recess 20 in the stern of the barge 11 adapted to receive the bow of the pushing tug 10. The centerline in FIG. 3 shows the location of the laterally extendible hinge pins 16 and 18.

Referring now more particularly to FIG. 4, there is here shown a fragmentary cross-sectional view of the vessel 10 in the vertical plane of the centerlines of the hinge pins 16 and 18. In the view shown and for purposes of convenience the starboard hinge pin 16 is in extended position and the port hinge pin 18 is shown in the retracted position. In use, of course, both hinge pins are extended as shown in FIG. 1. Otherwise, both hinge pins are normally retracted.

As indicated above, the hinge pins are generally cylindrical bodies approximately 10 feet long and 4 feet in diameter having a hemispherical nose such as nose 22. The port hinge pin is provided with a nose 24. The hinge pins 16 and 18 are slidably mounted between decks 26 and 28 in a rubber sleeve bearing 30 for the starboard hinge pin 16 and rubber sleeve bearing 31 for the port hinge pin 18. Between decks 26 and 28 there is located a vertically disposed centrally located reaction plate 32. On the starboard side of the plate 32 there is provided a bracket 34 in which is pivotally mounted one end 36 of a hydraulic jack 38 having an extensible arm 40. The extensible arm 40 is pivotally attached at its distal extremity 42 to a bulkhead 44 which is in turn secured to the cylindrical wall of the hinge pin. The port hinge pin 18 is similarly fitted with a hydraulic jack 46 for lateral movement thereof through the sleeve bearing 31. Any suitable means (not shown) may be provided to prevent or limit rotation of the hinge pin relative to the tug.

As indicated above, the sleeve bearings 30 and 31 are conveniently of the elastomeric type. A lantern ring 48 is conveniently provided for the distribution of a lubricating medium such as water to the interfacee between the elastomeric bearing 30 and the surface of the starboard hinge pin 16. The port hinge pin 18 is similarly fitted.

Internally mounted within the hinge pin 16 there is provided a lubricant-supplying piping system generally indicated at 50 including radial pipes 52, 56, 58, and 60, for example, by which lubricating medium is carried to the external surface of the starboard hinge pin 16. The radial line 56, for example, is provided with a surface port or outlet 62 through which grease or other lubricating medium may be forced under pressure to the interface between the outer surface of the starboard hinge pin 16 and the bearing 30. In like manner, the other radial lubricant lines are also provided with lubricant ports. The piping arrangement is conveniently fed by a flexible grease hose 64 which communicates with a conventional timer-operated pressure greasing system. Grease flow control sensing means of conventional design may be provided at each outlet such as outlet 62.

The port hinge pin 18 is similarly fitted with lubricating means.

The structure which has been described to this point is environmental and conventional, the improvement of the present invention being in the bearing elements and bearing housing arrangement carried by the barge 11.

FIG. 5 shows in fragmentary cross-sectional form a hinge pin-receiving cylinder carried by the wing wall of a barge such as barge 11. The cylinder is generally indicated at 70 and comprises a closed chamber having an inboard end wall 71 isolating the chamber from the balance of the barge. Since the cylinder 70 is closed at its inner end, in order to facilitate escape of air from the cylinder 70 when the hinge pin is inserted, there is provided a vent pipe 72. The cylinder 70 is provided with an internal shoulder 74 which serves as an abutment surface for rubber bearing staves such as bearing stave 76. In a typical installation, the cylinder or housing 70 will be provided with a total of 24 staves for 360°. The rubber staves are conveniently single durometer solid molded elements. In a typical installation, each stave 76 is 60 inches long and covers 15° of arc.

Referring now more particularly to FIG. 6, there is here shown in detail of the outboard extremity of the barge hinge pin housing 70. There is here shown a rubber bearing stave 76 having provided therein a lubricating medium retaining groove 78 which terminates short of the outboard extremity of the stave 76 to provide a dam portion 80 effectively closing off the groove 78 to prevent movement of lubricating medium past the dam 80. The inboard extremity of the lubricating groove 80 may optionally be provided with a dam portion. However, this has not been found to be necessary. The staves 76 abut an annular ring 82 which provides a mounting plate for a segmented retaining ring 84. As best shown in FIG. 7, the segmented retaining ring 84 is formed of 12 30° segments, e.g., segment 86. Each segment 86 is provided with plug-type lock nut receiving bores 88 and 90' for securing the segment 86 to the annular ring 82. Thus, as shown in FIG. 6, there is provided a drilled and tapped bore 92 in the annular ring 82 and a stud 94 extending therefrom. The ring segment 86 is provided with a plug nut recess 96 and a counterbore 98 through which the stud 94 extends. The lock nut 90 is conveniently provided with a recess 100 to receive a wrench and an encircling rubber collar 102 for frictional water-tight engagement with the sidewalls of the recess 96. The staves 76 are conveniently molded to a length slightly in excess of the ultimate secured length so that when the segments 86 are tightened down, the extremities of the staves 76 are compressively stressed. For most purposes, the staves 76 are from 0.5 to 1.0 inch longer than their respective cylinder seats in the housing 70. Also shown in FIG. 6 is a portion of the chafing plate 104 and the shock pad 106 intermediate the sidewall 108 of the wing wall of the barge. The structure of the sidewalls of the barge form no part of the present invention and need not be further described. In a typical embodiment, the staves 76 are approximately 60 inches long, 2.25 inches thick, and 0.75 inches longer than the seat therefor in the cylindrical housing 70.

Figure 8:
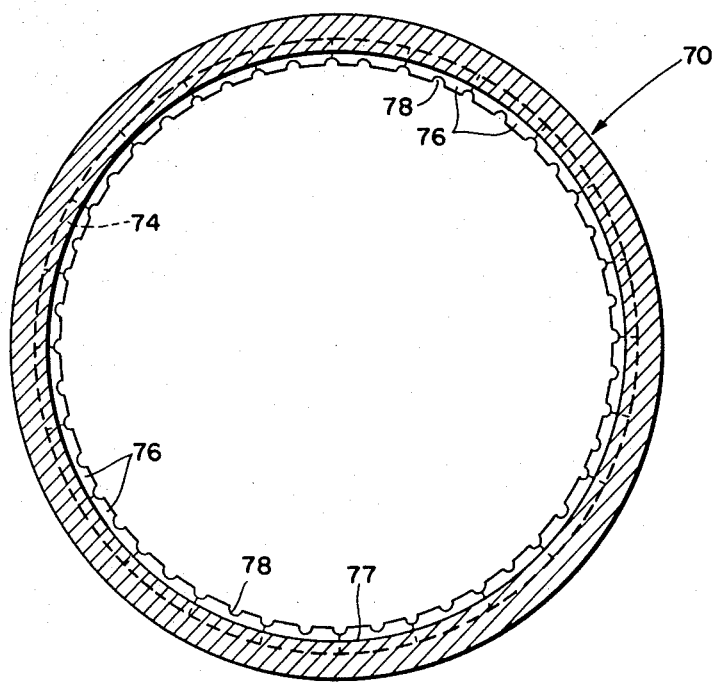
FIG. 8 is a cross-sectional view through the hinge pin-receiving cylinder as it appears in the plane indicated by the line 8—8 in FIG. 5.

FIG. 8 is a cross-sectional view as it appears in the plane indicated by the line 8—8 in FIG. 5. This shows the rubber bearing staves 76 in place to form an elastomeric hinge pin encircling bearing surface which coacts between the hinge pins and the cylinder or housing 70 in the barge. In assembling the staves 76, it is desirable to provide a master stave 77. At this location, there are to be no studs for retaining the master stave 77.

FIG. 9 shows in perspective a portion of an elastomeric bearing stave 76. Each stave 76 is conveniently provided with a wide mouth bore 110 and a counterbore 112 at two locations spaced from the extremities of the staves from one-third to one-quarter of the length thereof. As best shown in FIG. 10, studs 114 are welded to the housing wall 70 for registry with the counterbores 112 to enable relatively loose securement of the staves to the housing by means of a washer 116 and a nut 118. Axial movement of the staves 76 is desirably not prevented by these securement means and their purpose is to prevent dislodgment of the staves 76 when the tug and the barge are separated. By allowing axial movement along the full length of the stave, the compressive stress imposed by segments 86 is distributed over the full length of the staves 76.

Also as shown in FIGS. 9 and 10, the configuration of the stave is such as to provide an axially extending groove 78 molded therein and adjacent the extremity of the stave a dam portion 80. Marginal half-groove portions 120 and 122 coact with contiguous portions on adjacent staves to provide also lubricating medium retaining grooves in the same manner as to centrally located grooves such as groove 78. Marginal dam portions 124 and 126 restrict the flow of lubricating medium and limit escape thereof at the outboard extremities of the bearing.

What is claimed is:

1. In an articulated tug/barge assembly including a pusher tug vessel having a pair of retractable hinge pins laterally extendible from the sides of the vessel at the bow, respectively, and a barge having a bow-receiving recess in the stern thereof including laterally disposed hinge pin-receiving means; the improvement which comprises housing means carried by said barge and adapted to surround said hinge pins when extended from said vessel and a plurality of segmental elastomeric bearing staves forming an elastomeric hinge pin encircling bearing surface coacting between said hinge pins, respectively, and said barge housing means, said elastomeric bearing staves each having an axially extending lubricating medium groove and an integral groove dam portion at at least one end thereof, and an annular retaining means coacting between each housing and the bearing staves contained therein for holding said bearing staves and compressively stressing said staves adjacent said at least one dam portion, and means carried by said hinge pins for conducting lubricating medium to the interface between said hinge pins and said elastomeric bearing surfaces.

2. An articulated tug/barge assembly in accordance with claim 1 wherein the axially extending lubricating medium groove is centrally located in each stave.

3. An articulated tug/barge assembly in accordance with claim 2 wherein each stave is additionally provided with longitudinal marginal half-grooves and half-dam portions at the outboard ends thereof whereby adjacent staves provide a full lubricating medium groove and a dam at the outboard end thereof.

4. An articulated tug/barge assembly in accordance with claim 1 wherein the annular retaining means includes a plurality of circular segments fastened to said housing.

5. An articulated tug/barge assembly in accordance with claim 4 wherein the circular segments are 30° segments and the segmented bearing staves are 15° segments.

6. An articulated tug/barge assembly in accordance with claim 1 wherein the housing includes an inboard annular shoulder against which the inboard ends of the staves abut.

7. An articulated tug/barge assembly in accordance with claim 6 wherein the staves are each slightly longer in the free state than the assembled distance between annular shoulder and the annular retaining means.

* * * * *